(12) United States Patent
Piehl (10) Patent No.: US 6,987,610 B2
(45) Date of Patent: Jan. 17, 2006

(54) PROJECTION SCREEN

(75) Inventor: Arthur R. Piehl, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/692,266

(22) Filed: Oct. 23, 2003

(65) Prior Publication Data

US 2005/0088737 A1    Apr. 28, 2005

(51) Int. Cl.
G03B 21/56    (2006.01)
G03B 21/00    (2006.01)

(52) U.S. Cl. .................... 359/443; 353/122
(58) Field of Classification Search ........... 359/443, 359/449; 353/84, 122
See application file for complete search history.

(56) References Cited

U.S. PATENT DOCUMENTS

| | | | |
|---|---|---|---|
| 3,881,800 A * | 5/1975 | Friesem ................ 359/443 |
| 4,003,080 A | 1/1977 | Maiman et al. | |
| 4,323,301 A * | 4/1982 | Spector ................ 359/443 |
| 4,713,577 A | 12/1987 | Gualtieri et al. | |
| 4,798,994 A | 1/1989 | Rijpers et al. | |
| 5,045,706 A | 9/1991 | Tanaka et al. | |
| 5,095,244 A | 3/1992 | Maeda et al. | |
| 5,162,160 A | 11/1992 | Matsui et al. | |
| 5,193,015 A | 3/1993 | Shanks | |
| 5,957,560 A * | 9/1999 | Do et al. ................ 353/84 |
| 6,128,131 A * | 10/2000 | Tang ................ 359/443 |
| 6,373,184 B1 | 4/2002 | Suh et al. | |
| 6,816,306 B2 * | 11/2004 | Freese et al. ............ 359/456 |
| 2004/0100692 A1 * | 5/2004 | Hou ................ 359/449 |

* cited by examiner

Primary Examiner—Christopher Mahoney (57) ABSTRACT

A projection screen for use in a projection system is described. In an embodiment of the present invention, a projection screen includes a substrate having one or more fluorescent materials. The one or more fluorescent materials emit visible light with the incidence of one or more ranges of wavelengths of light. The one or more fluorescent materials absorb visible light in at least one other range of wavelengths that is not included in the one or more ranges. The visible light emitted by the one or more fluorescent materials provides an image with the incidence of an output from a projector. The output of the projector has wavelengths of light in the one or more ranges.

23 Claims, 10 Drawing Sheets

PROJECTION SCREEN

TECHNICAL FIELD

The present invention generally relates to the field of image projection and more particularly to a projection screen.

BACKGROUND

Projectors are utilized in a variety of environments. From home theaters to business presentations, projectors are provided to offer a wide range of functionality to consumers. For example, a projector may provide a display of a slide show, a display of a movie in a home theater environment, and so on. To display an output of the projector, a projection screen may be utilized. The projection screen may be configured to reflect the output of the projector such that it is viewable by one or more people. For example, a projection screen in a movie theater environment may reflect light that is projected by a movie projector to be viewable by people in the movie theater.

The environment in which the projector and screen are utilized may have an effect on the visual quality of the image that is displayed on the screen. For example, one measure of the visual quality of a projected image is contrast ratio. Contrast ratio is the ratio of the brightness of a white pixel, i.e. picture element, to the brightness of a black pixel. Because a typical projection screen may be highly reflective to reflect light from a projector, a black pixel is generally as white as the ambient lighting in the environment that includes the projection screen. To maximize contrast ratio, projectors may use bright light sources to make white pixels much brighter than ambient light. This, however, is costly to the projectors in terms of power, size and heat dissipation. Further, this cost is increased by the amount and type of ambient light that is encountered by a projector for use in the environment. For instance, as the amount of ambient light increases in an environment, a projector which is configured for the environment may include a higher-powered light source, which may increase both the size and the cost of the projector.

Therefore, it would be an advance in the art to provide an improved projection screen.

BRIEF DESCRIPTION OF THE DRAWINGS

The same reference numbers are used throughout the drawings to reference like features and components.

DETAILED DESCRIPTION

Overview

A projection screen for use in a projection system is described. In an embodiment of the present invention, a projection screen includes a substrate having one or more fluorescent materials. Fluorescent materials are understood to include fluorescent dyes, fluorescent pigments, and phosphorescent materials. The one or more fluorescent materials emit visible light with the incidence of one or more ranges of wavelengths of light. For example, the fluorescent materials may emit visible light when visible and/or ultraviolet light having wavelengths in the one or more ranges strikes the fluorescent materials. The one or more fluorescent materials may also absorb visible light in at least one other range of wavelengths that is not included in the one or more ranges. The visible light emitted by the one or more fluorescent materials provides an image with the incidence of an output from a projector. The output of the projector has wavelengths of light in the one or more ranges. The projector, for instance, may project an image on the projection screen. The projected image is composed of light having wavelengths in the one or more ranges. When the projected image strikes the fluorescent materials of the projection screen, the fluorescent materials emit visible light such that the image is displayed.

In another embodiment of the present invention, a projection system includes a projector and a projection screen. The projector is configured to project an image composed of one or more ranges of wavelengths of light. The projection screen is configured to emit visible light with the incidence of the one or more ranges of wavelengths of light. The projection screen is also configured to absorb visible wavelengths of light in at least one other range that is not included in the one or more ranges.

FIGS. 1–3, 5 and 10–11 illustrate exemplary embodiments of projection screens. The projection screens in each embodiment of the present invention may be configured in a variety of ways, such as for use in a home theater for display of a television program, for use in an office to display a slide-show presentation, for use in a movie theater, for use in a rear-projection television, and so on.

Figure 1:
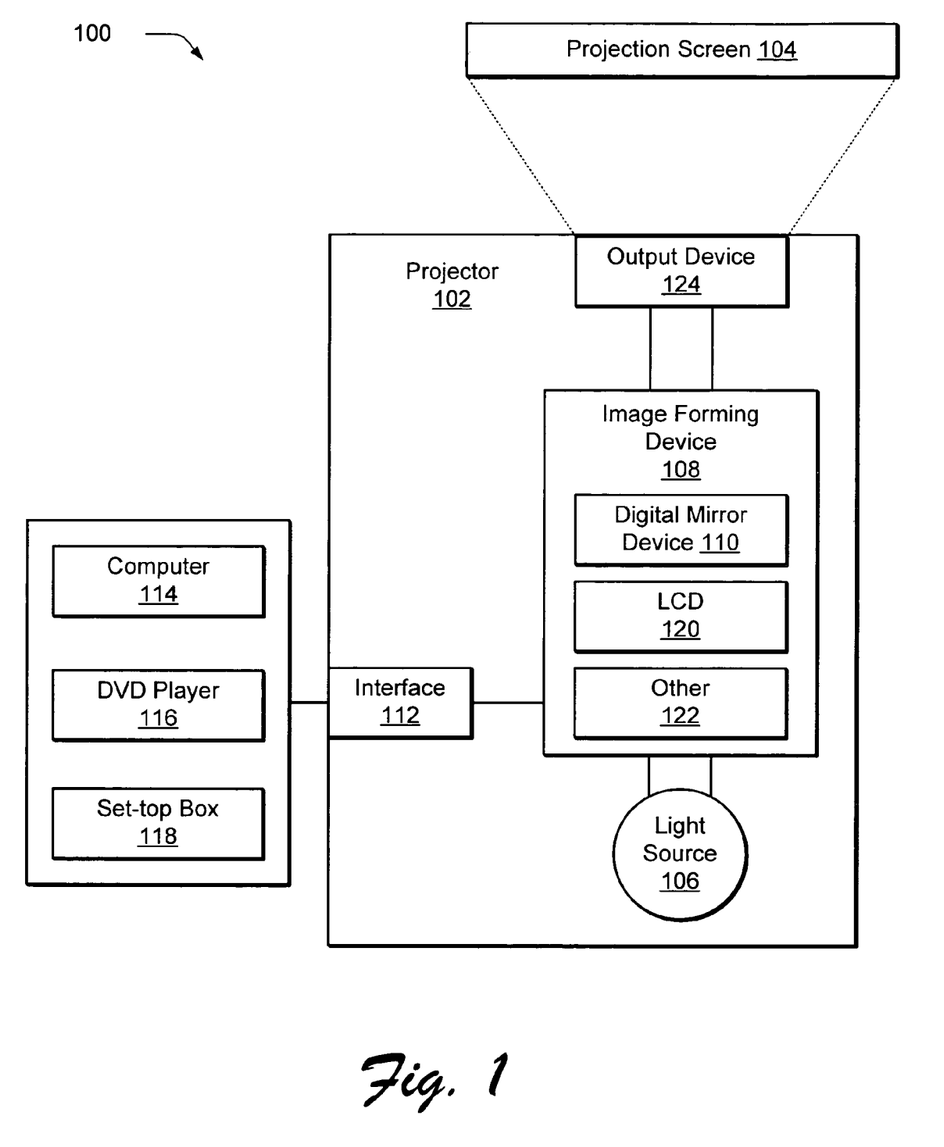
FIG. 1 is an illustration of an exemplary embodiment of the present invention that shows a projection system that includes a projector that provides an output for display on a projection screen.

FIG. 1 is an illustration of an exemplary embodiment of the present invention that shows a projection system 100 that includes a projector 102 that provides an output for display on a projection screen 104. The projector 102 includes a light source 106 that supplies light that is used to provide the output of the projector 102. The light source 106 may be configured in a variety of ways, such as an arc halogen discharge lamp. Arc halogen discharge lamps do not contain a filament to emit light but rather ionize a gaseous vapor though a high-energy arc discharge between two electrodes. Other light sources may also be utilized, such as incandescent light bulbs, fluorescent devices, white-light emitting diodes, and so forth.

Light from the light source 106 is directed toward an image forming device 108. The image forming device 108 provides an image using the light from the light source 106. To provide the image, the image forming device 108 may include a variety of components. In one embodiment, the image forming device 108 is configured to perform digital light processing through the use of a digital mirror device 110. The digital mirror device 110 includes a plurality of mirrors that are mounted onto a substrate. The mirrors of the digital mirror device 110 may be rotated individually, which causes each of the mirrors to either reflect or not reflect light from the light source 106.

If a single digital mirror device 110 is utilized, red, green and blue (RGB) portions of an image are shown in sequence to supply a colored image. For example, a color wheel that has red, green and blue (RGB) arcuate segments may be utilized to supply the colors. The color wheel is placed between the light source 106 and the digital mirror device 110 and is spun to provide red, green or blue light, depending on which segment of the color wheel that is placed in a pathway of light that is output from the light source 106 to the digital mirror device 110. Configuration of the mirrors on the digital mirror device 110 is synchronized with the placement of the segments of the color wheel in the light path to provide sequential red, green and blue images. By supplying the sequential images in rapid sequence, a full color image is perceived by the human eye. In another embodiment, multiple digital mirror devices are utilized to form an image. For example, separate digital mirror devices may be utilized to provide respective outputs of red, green and blue light. Light reflected from each of the separate digital mirror devices is combined to display a full color image.

The mirrors of the digital mirror device 110 may be configured in response to an input received from an interface 112. The input may be supplied to the interface 112 from a variety of devices, such as through a computer 114, a DVD player 116, a set-top box 118, and so forth. For example, the computer 114 may provide an input that causes a slide show to be displayed by the image forming device 110.

In another embodiment of the present invention, the image forming device 108 is configured to include a liquid-crystal display (LCD) 120. For example, the LCD 120 may include a stationary mirror. Light from the light source 106 is transmitted through the LCD 120 and reflected from the stationary mirror to provide an image. The LCD 120 is utilized to control the light reflected from the stationary mirror by controlling transmission of red, green and/or blue light at each pixel of the LCD 120. Like the mirrors of the digital mirror device 110, each pixel of the LCD 120 may be configured in response to input received from the interface 112. Although an image forming device 108 including a digital mirror device 110 and/or an LCD 120 is described, other components 122 may also be utilized in the image forming device 108 to form an image, such as a grating light valve (GLV) or a liquid crystal on silicon (LCOS) device. Although the illustrated projector 102 shows a separate image forming device 108 and a separate light source 106, components may be added, combined and/or deleted in various embodiments.

Light that is transmitted by the image forming device 108 is output using an output device 124, such as a lens, one or more mirrors, and so on. Light output by the output device 124 is then displayed on the projection screen 104 for viewing. To increase the image quality of the display on the projection screen 104, the projection screen 104 may be configured to match the output of the projector 102. For example, the projection screen 104 may employ optical filtering to reduce the amount of ambient light 126 output by an ambient light source 128 that is reflected by the projection screen 104.

Figure 2:
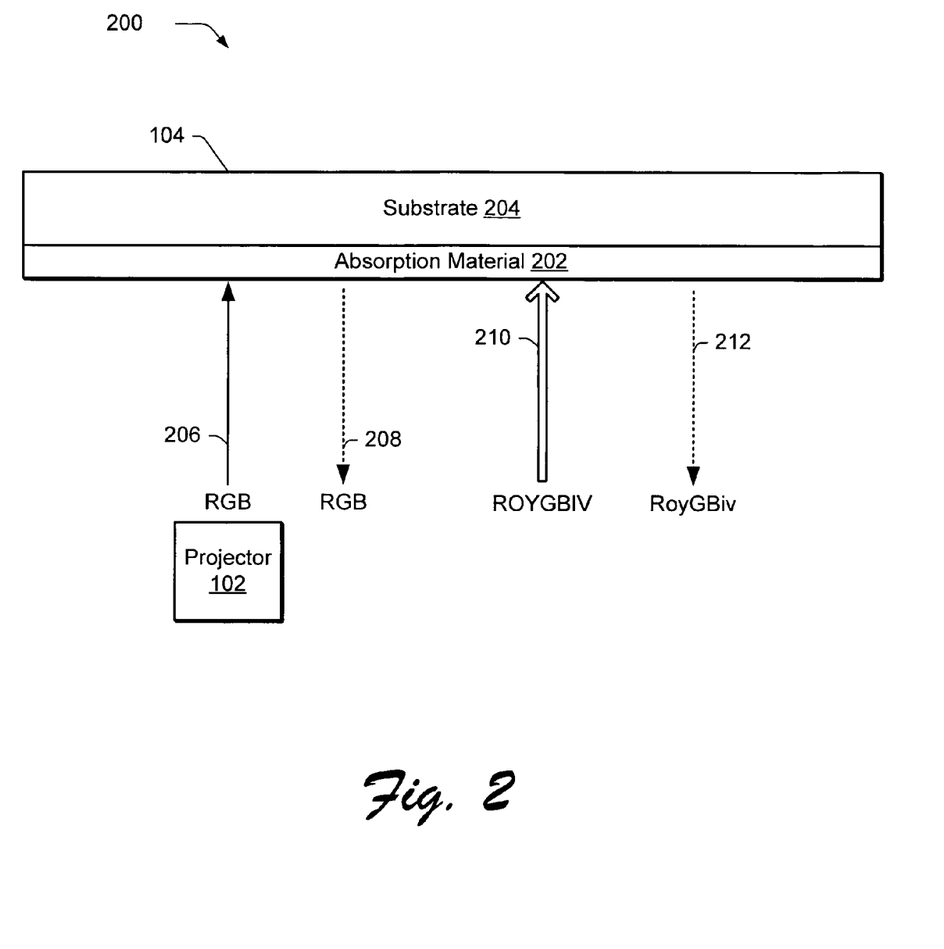
FIG. 2 is an illustration of an exemplary embodiment of the present invention showing the projection screen of FIG. 1 in greater detail.

FIG. 2 is an illustration of an exemplary embodiment 200 of the present invention showing the projection screen 104 of FIG. 1 in greater detail. As previously stated, a measure of visual quality of a projected image is contrast ratio. Contrast ratio of the projection screen 104 may be affected by ambient light in an environment that includes the projection screen 104. To reduce the effect of ambient light on a display of the output from the projector 102 on the projection screen 104, the projection screen 104 utilizes optical filtering to reduce the amount of ambient light, e.g. light that is not output by the projector 102 of FIG. 1, which is re-emitted by the projection screen 104.

The projection screen 104, for example, may employ an absorption material 202 on a substrate 204 of the projection screen 104 that reflects the output from the projector 104 and absorbs ambient light. Absorption is an optical property that describes a fraction of light waves that are lost through absorption of photons by atoms in a material. Absorption is a function of a path length "L" through the material and the absorption coefficient "α" of the material. Absorption is represented by a ratio of the amount of light "I" that passes through the material to the amount of light "$I_o$–R" entering the material ($I_o$ is the amount of light incident on the material surface. R is the amount of light reflected from the surface). Absorption may be represented as follows:

$$\frac{I}{I_o - R} = e^{-\alpha L}$$

If a light wave of a given wavelength strikes a material with electrons that correspond to the wavelength, e.g. have the same frequency of vibration as the frequency of the light wave, the electrons of the material will absorb the energy of the light wave and transform it into vibrational motion. The vibration of the electrons causes an interaction with neighboring electrons such that the vibrational energy is converted into thermal energy. Thus, a light wave is absorbed which has a frequency that matches the vibrational frequency of the electrons of the material. In this way, a material with a selective absorption may be provided which absorbs particular wavelengths of light. By selecting one or more materials having selective absorption for inclusion on the projection screen 104, the projection screen 104 may be configured to reflect light that is output by the projector 102 and to absorb ambient light, i.e. light that is not output by the projector 102. The absorption materials may include a pigment, optical coating, optical dye, filter, and so on.

The projector 102 provides an output of light 206 that is composed of red, green and blue light, which is represented by "RGB" in FIG. 2. Red, green and blue light is utilized by the projector 102 through an additive color technique to provide a full color image. The additive color technique mixes various amounts of red, green and blue light, i.e. primary colors, to produce other colors. For example, by combining two primary colors, secondary colors of cyan, magenta or yellow may be produced. By combining all three primary colors, a display of white is produced. The absence of all three primary colors is utilized to produce a black display.

A variety of techniques may be employed by the projector 102 to provide a full-color image utilizing the RGB additive color technique. For example, separate red, green and blue portions of an image may be output in rapid sequence such that a full color image is perceived by the human eye. In another embodiment, red, green and blue portions of an image are output concurrently to supply a full-color image. In a further embodiment, the projector 102 includes the LCD 120 of FIG. 1. Pixels of the LCD provide red, green and blue light. A human eye views colors that are formed by the mixture of light provided by the pixels as a whole. Therefore, a full color image may be formed from pixels that provide colors that are produced from the mixture of red, green and/or blue light.

The projection screen 104 is configured to provide re-emitted light 208 from the light 206 that was output by the projector 102. The re-emitted light 208 includes the red, green and blue light, which is illustrated in FIG. 2 by the letters "RGB". The letters "RGB" are shown as capital letters for the re-emitted light 208 that match the capital letters "RGB" for the light 206 to signify that a substantial portion of the light 206 output by the projector 102 was re-emitted by the projection screen 104 to provide re-emitted light 208.

The absorption material 202 of the projection screen 104 is utilized to absorb wavelengths of light that are not output by the projector 102. For instance, sunlight 210 may be provided which includes each of the wavelengths of visible light. For purposes of the present discussion, the wavelengths of visible light will be described as a range of wavelengths of red, orange, yellow, green, blue, indigo and violet visible light, which are illustrated in FIG. 2 by the letters "ROYGBIV". The absorption material 202 absorbs wavelengths of light that are not output by the projector 102, which in this embodiment are orange, yellow, indigo and violet wavelengths of light. Therefore, the amount of orange, yellow, indigo and violet wavelengths of light that is included in reflected sunlight 212 is reduced by the absorption material 202. The red, green and blue wavelengths of visible light are not absorbed by the absorption material 202, but rather are reflected by the projection screen 104 in a manner similar to the reflection provided by the projection screen 104 for the output of the projector 102. Therefore, the reflected sunlight 212 includes a substantial portion of the red, green and blue wavelengths of the sunlight 210. A substantial portion of the orange, yellow, indigo and violet wavelengths of the sunlight 210 was removed through absorption by the absorption material 202. This is illustrated in FIG. 2 by the use of corresponding capital and lower case letters to denote the intensity of light in the respective ranges, which for the reflected sunlight 212 is illustrated as "RoyGBiv".

Although reflection of a substantial portion of light by the projection screen 104 has been described, the substantial portion described may vary depending on the reflectivity of the projection screen 104. For example, the projection screen 104 may have an eighteen percent reflectivity of red, green and blue light and a 5 percent reflectivity of orange, yellow, indigo and violet light. Therefore, the projection screen 104 in this example reflects a substantial portion of red, green and blue light with respect to the amount of light of orange, yellow, indigo and violet light reflected by the projection screen 104. Therefore, the amount of ambient light has been reduced.

Figure 3:
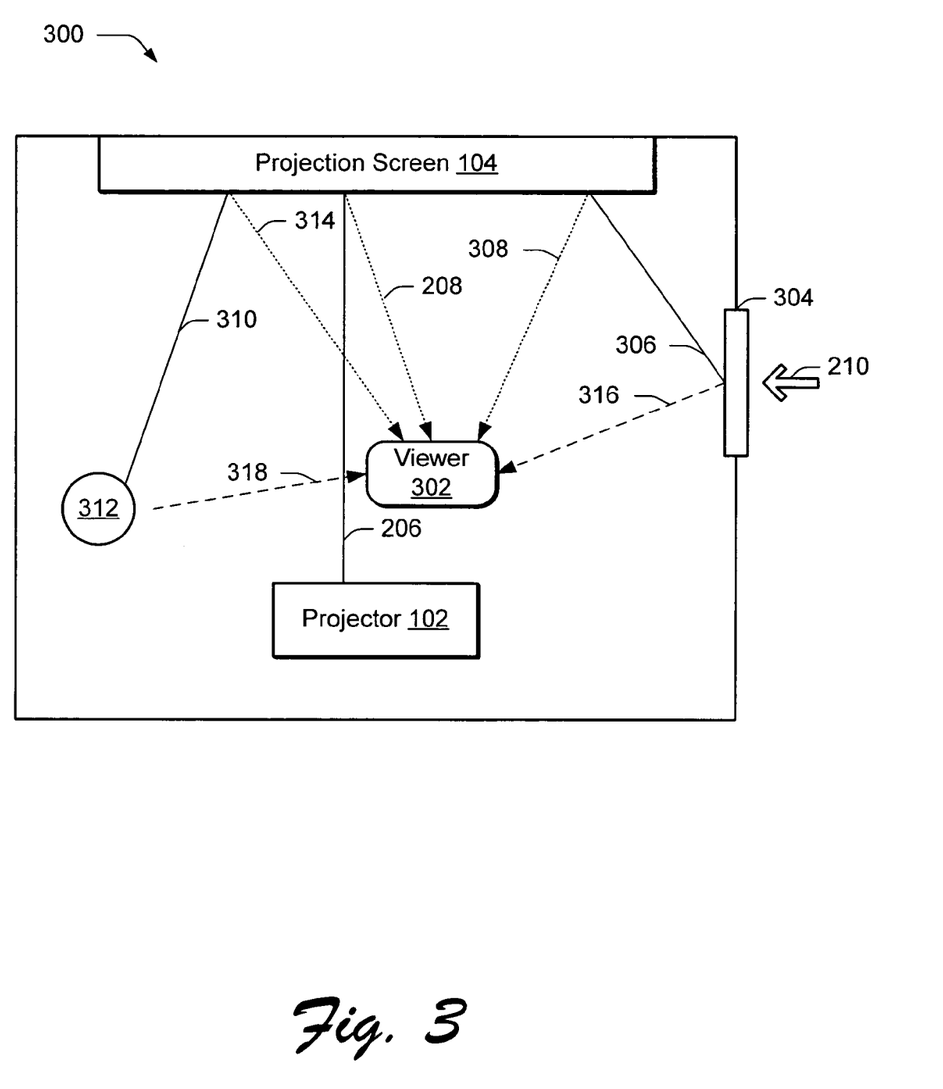
FIG. 3 is an illustration of an exemplary embodiment of the present invention showing an environment that includes the projector of FIG. 1 and the projection screen of FIG. 2.

FIG. 3 is an illustration of an exemplary embodiment of the present invention showing an environment 300 that includes the projector 102 and the projection screen 104 of FIG. 2. The projector 102 in this embodiment is illustrated as a front-projection projector that outputs light 206 that forms an image that is re-emitted by the projection screen 104 as re-emitted light 208. A viewer 302 views the re-emitted light 208 to watch the output provided by the projector 102. For example, the light 206 that is output by the projector 102 may include a series of still images that provide a moving scene of a movie. The series of still images are re-emitted by the projection screen 104 such that the moving scene may be watched by the viewer 302.

Ambient light may be provided from a variety of light sources. For example, a window 304 transmits light 306 that is a portion of the sunlight 210 that strikes the window 304. A portion of the transmitted light 306 is reflected by the projection screen 104 such that first reflected light 308 is directed at the viewer 302. Additionally, light 310 that is output by a lamp 312 may be reflected by the projection screen 104 such that second reflected light 314 is directed at the viewer 302. The projection screen 104 absorbs a substantial portion of light 310 that is output by the lamp 312 and the light 306 that is transmitted by the window 304 such that contrast ratio of an image is preserved that is projected on the projection screen 104 by the projector 102. Further, by providing absorption of the ambient light by the projection screen 104, increased amounts of ambient light may be utilized in the environment 300 that includes the projection screen 104 and the projector 102. Therefore, the viewer 302 may be provided with light 316, 318 from the window 304 and lamp 312, respectively. In this way, the viewer 302 is provided with an image from the projection 102 that is displayed on the projection screen 104 in a well-lit environment that preserves the contrast ratio of the image.

Figure 4:
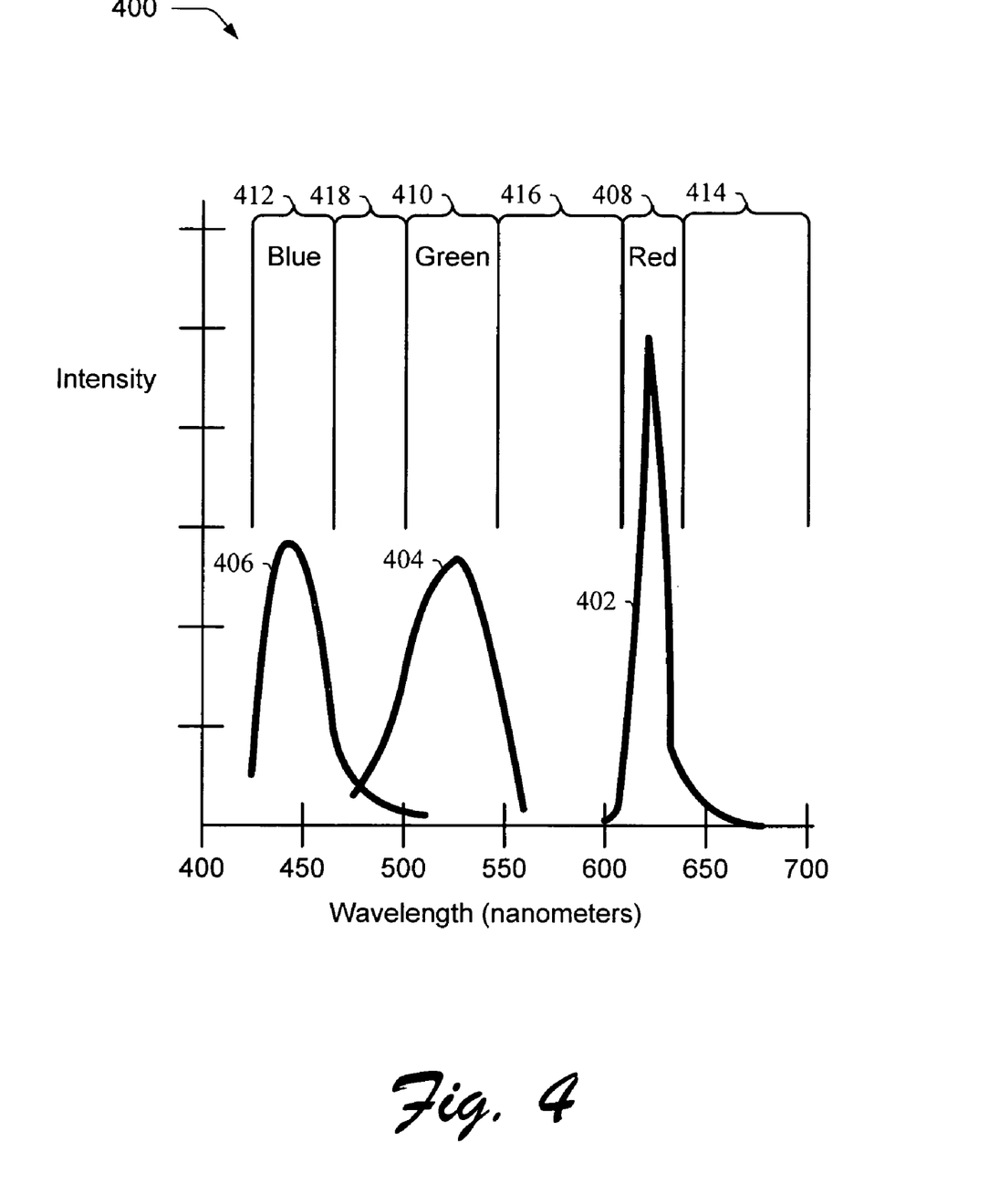
FIG. 4 is an illustration showing light that is output by the projector of FIG. 2 plotted on a graph having a first axis that describes wavelengths of visible light and a second axis that describes intensity of visible light.

FIG. 4 is an illustration showing ranges of wavelengths of light that are output by the projector 102 of FIG. 2 plotted on a graph 400 having a first axis that describes wavelengths of visible light and a second axis that describes intensity of visible light. As previously described, the projector 102 of FIG. 2 outputs red, green and blue light 402, 404, 406 to form a full color image when viewed by the human eye. The red light 402 is composed of a first range 408 of wavelengths of visible light in the red part of the visible spectrum. The green light 404, which is output by the projector 102 of FIG. 2, is composed of a second range 410 of wavelengths of visible light in the green part of the visible spectrum. Likewise, the blue light 406 is composed of a third range 412 of wavelengths of visible light in the blue part of the visible spectrum. The projection screen 104 of FIG. 2 is configured to absorb wavelengths of light that are not output by the projector 102. For example, the absorption material 202 of the projection screen 104 of FIG. 2 may absorb ranges 414, 416, 418 of wavelengths of light that are not included in the first, second and third ranges 408–412.

Although light that is output by the projector 102 has been described as having ranges of red, green and blue wavelengths, a variety of ranges of wavelengths of light may be utilized. In an embodiment, the projector 102 of FIG. 2 may output primary and secondary colors to provide greater color depth to a projected image. For instance, the projector may output the primary colors of red, green and blue light and secondary colors such as cyan, magenta and yellow. In another embodiment, the projector 102 of FIG. 2 may output a single range of wavelengths of light to provide a monochromatic image when displayed on the projection screen 104. The projection screen 104 may also emit light, as will be further discussed in the following embodiments.

Figure 5:
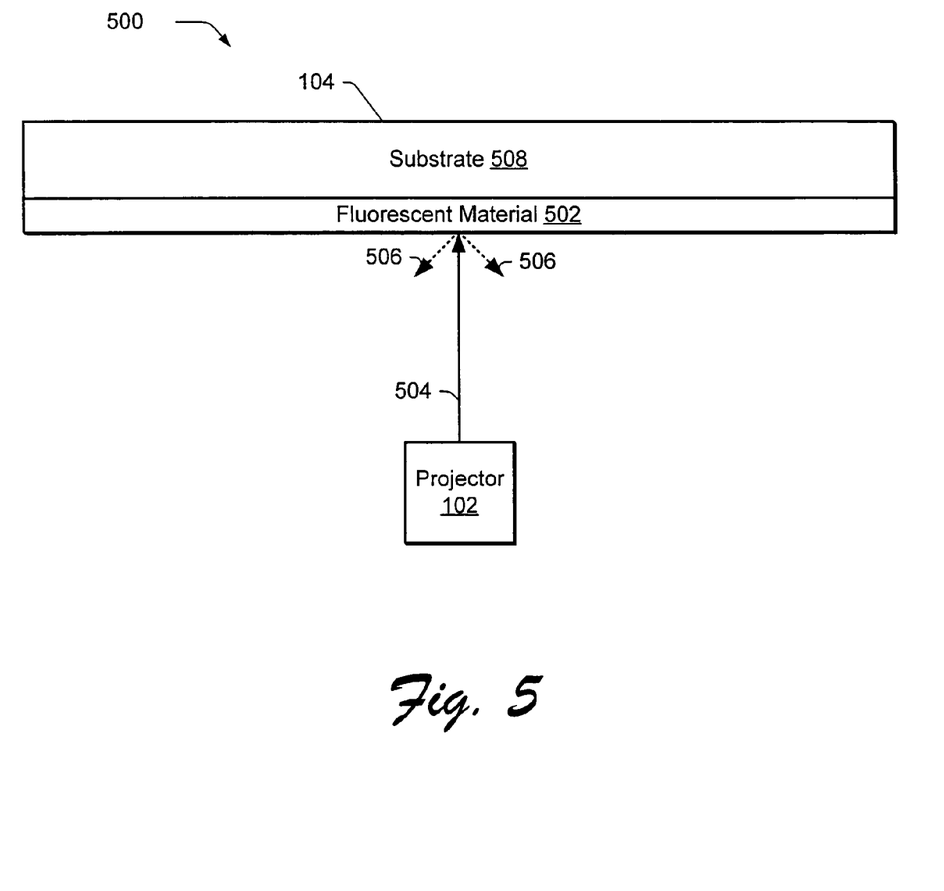
FIG. 5 is an illustration of an exemplary embodiment of the present invention wherein the projection screen of FIG. 1 includes a fluorescent material that emits light.

FIG. 5 is an illustration of an exemplary embodiment 500 of the present invention wherein the projection screen 104 of FIG. 1 includes a fluorescent material 502 that emits light. Instead of or in addition to redirecting light from the projector 102, the projection screen 104 may absorb light 504 output by the projector 102 with the fluorescent material 502 and emit light 506 at a slightly different wavelength. Therefore, the projection screen 104 may emit light 506 with the incidence of the light 504 output by the projector 102. Light 506 is emitted by the fluorescent material 502 when the molecules of the fluorescent material 502 are excited by light of a certain wavelength. The absorption of light by the fluorescent material 502 boosts electrons in the fluorescent material 502 to a higher unstable state. The excited electrons fall back to a stable ground state and emit light of a specific wavelength. The emission spectrum of the fluorescent material 502 is shifted towards a longer wavelength than the absorption spectrum of the fluorescent material 502. In other words, wavelengths of light that excite the fluorescent material 502 are shorter than wavelengths of light that are emitted by the fluorescent material 502.

Emission of light by the fluorescent material 502 may provide a diffuse output of light from the projection screen 104. For example, by emitting light, the projection screen 104 may convert a directional projected light 504 output by the projector 102 into emitted light 506 having a diffuse, Lambertian distribution (i.e., a luminous distribution that is uniform for all directions). The Lambertian distribution is illustrated in FIG. 5 by the multiple dashed arrows depicting the emitted light 506. In one embodiment, fluorescent material 502 is used with narrow excitation spectra having the same wavelengths as the light 504 output by the projector 102, such as the ranges 408, 410, 412 shown in FIG. 4. Therefore, wavelengths of light outside this range (e.g., the ranges 414, 416, 418 shown in FIG. 4) are absorbed and the fluorescent material 502 performs similarly to the absorption material 202 of FIG. 2. In this way, the projection screen 104 may discriminate between the desirable projected light and the undesirable ambient light, thereby increasing contrast and color saturation.

The projection screen 104 may be configured in a variety of ways that provide emission of light. In one embodiment, the projection screen 104 is designed to be purely emissive with a black substrate 508 to minimize reflection of both ambient light as well as light from the projector 102 to maximize image contrast. Additional embodiments of a projection screen are discussed in relation to FIGS. 10 and 11.

Figure 6:
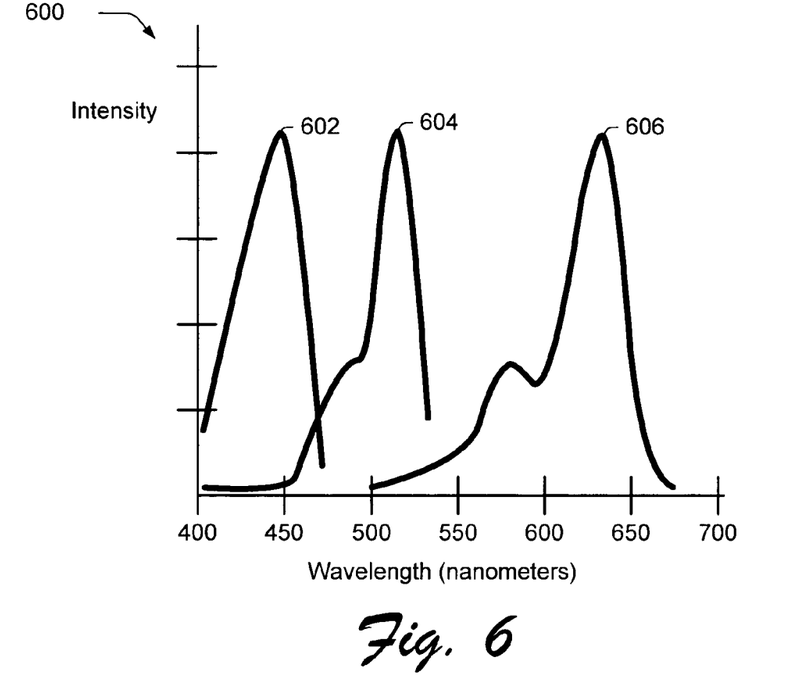
FIG. 6 is an illustration of a graph showing excitation spectra of exemplary fluorescent material.
Figure 7:
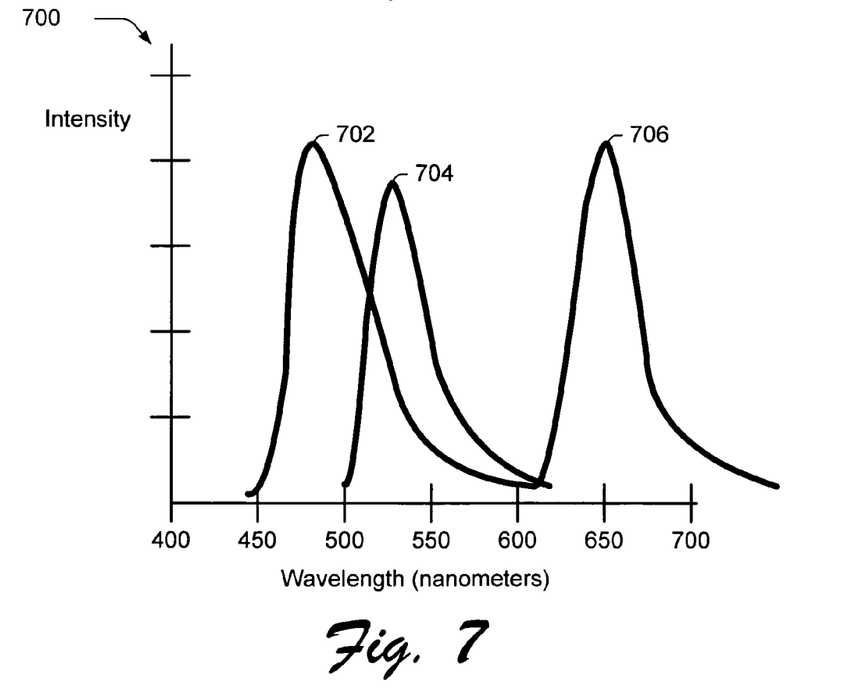
FIG. 7 is an illustration of a graph showing emission spectra of the fluorescent materials that have the excitation spectra shown in FIG. 6.

FIGS. 6 and 7 are illustrations of graphs 600, 700 showing excitation and emission spectra, respectively, of exemplary fluorescent materials that have narrow spectra. As previously described, the projector 102 of FIG. 5 may project light having ranges of wavelengths in the red, green, and blue portions of the visible spectrum. In this embodiment, each of the ranges of light output by the projector 102 is sufficiently narrow so that one color does not excite an adjacent color.

The graph 600 of FIG. 6 illustrates excitation spectra 602, 604, 606, respectively, for fluorescent materials of sytox blue, enhanced yellow fluorescent protein (EYFP), and alexa 633. Sytox blue, enhanced yellow fluorescent protein (EYFP), and alexa 633 are fluorescent dyes that have absorption and emission spectra, respectively, in the ranges of blue, green and red light. The excitation spectra 602 of sytox blue illustrate absorption of light at wavelengths centered at 445 nanometers. As shown by the excitation spectra 604, EYFP absorbs wavelengths of light centered at 513 nanometers. The excitation spectra 606 of alexa 633 illustrate absorption of light at wavelengths centered at 632 nanometers.

The graph 700 of FIG. 7 illustrates emission spectra 702, 704, 706 for the fluorescent materials of sytox blue, EYFP and alexa 633. As shown by the emission spectra 702, sytox blue emitts light at wavelengths centered at 470 nanometers. The emission spectra 704 of EYFP illustrate emission of light at wavelengths centered at 527 nanometers. The emission spectra 706 of alexa 633 illustrate emission of light at wavelengths centered at 650 nanometers.

The projection device 102 of FIG. 5 may output wavelengths of light in ranges centered at 445 nanometers, 513 nanometers and 632 nanometers, respectively, to provide emission of visible light of a projection screen that includes sytox blue, EYFP, and alexa 633. The incidence of light output by the projection device 102 of FIG. 5 excites the fluorescent materials, which causes the fluorescent materials to output light in ranges centered at 470, 527 and 650 nanometers, respectively. In this way, the projection device 102 of FIG. 5 may provide red, green and blue light that causes the emission of red, green and blue light by the projection screen 104. Although the projection of red, green and blue light by the projector 102 of FIG. 5 has been described, a variety of other ranges of wavelengths may be output by the projector 102, as will be described in greater detail in the following embodiments.

Figure 8:
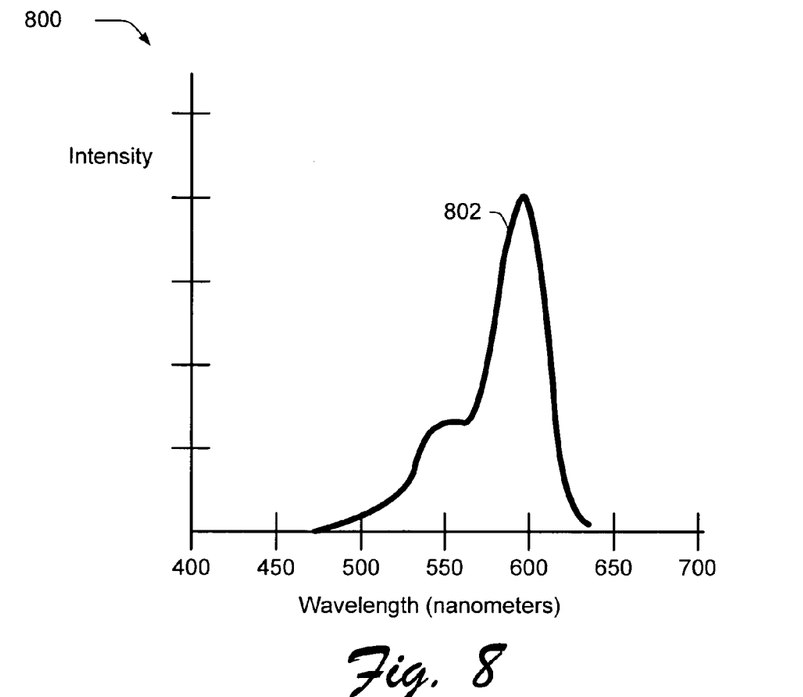
FIGS. 8 and 9 are illustrations of graph showing excitation and emission spectra, respectively, for Texas Red fluorescent dye.
Figure 9:
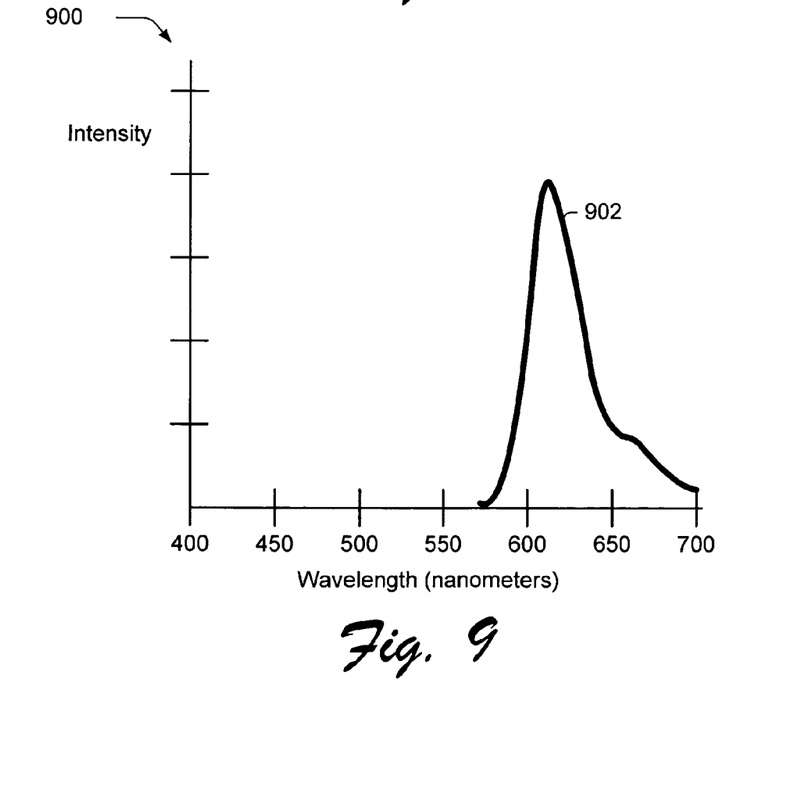

FIGS. 8 and 9 illustrate graphs 800, 900 of excitation and emission spectra, respectively, for Texas Red fluorescent dye (Texas Red). Projectors may include light sources that do not output wavelengths of light equally at each range of wavelengths in the visible spectrum. For example, high pressure mercury arc lamps have limited output of light having wavelengths longer than 600 nanometers. To increase the amount of light having wavelengths of light in ranges of the visible spectrum that are deficient, fluorescent materials may be utilized.

The graph 800 of FIG. 8 illustrates that the excitation spectra 802 for Texas Red is centered at 579 nanometers, which is included in the yellow part of the visible spectrum. The graph 900 of FIG. 9 illustrates that the emission spectra 902 for Texas Red is centered at 620 nanometers, which is included in the red part of the visible spectrum. Thus, if the fluorescent material 502 of the projection screen 104 of FIG. 5 includes Texas Red, the projection screen 104 may convert yellow wavelengths of light output by the projector 102 into red wavelengths of light for display of an image.

An output from the projector 102 may be configured to take advantage of the conversion properties of the projection screen 104. For example, to provide a display of a red image, the projector 102 may have a shifted color gamut to output a yellow image. The yellow image is converted by the projection screen 104 such that the red image is displayed. To shift the color gamut, the projector 102 may be configured in a variety of ways, such as through provision of a color wheel that matches the fluorescent properties of the fluorescent material 502 of the projection screen 104. The fluorescent material 502 of FIG. 5 may also convert non-visible light into visible light for display of an image that is output by the projector 102, as is described in greater detail in reference to FIG. 11.

Figure 10:
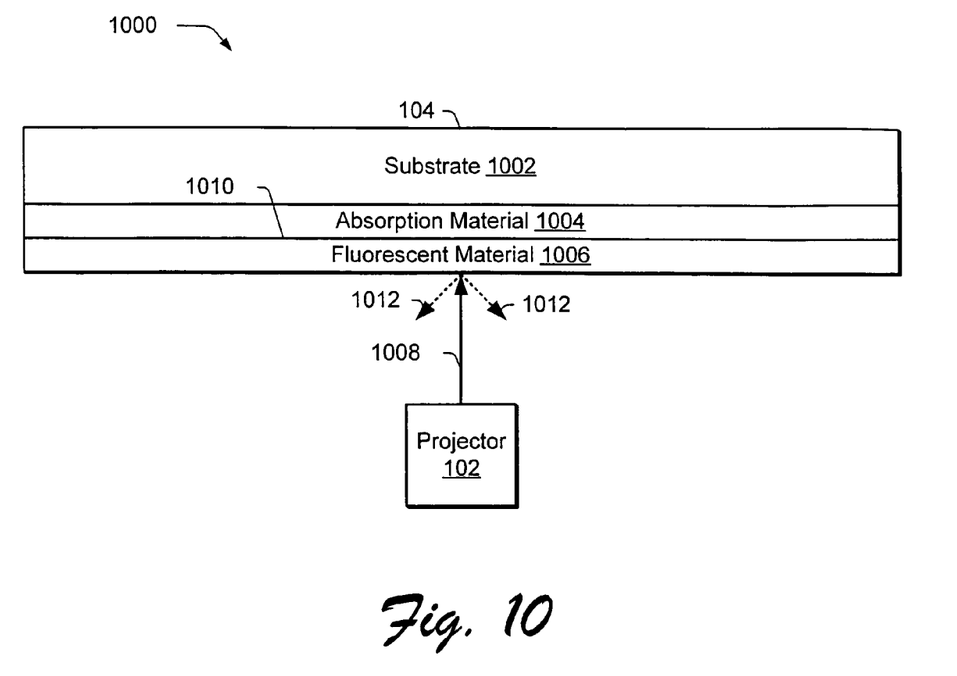
FIG. 10 is an illustration of an exemplary embodiment of the present invention wherein the projection screen of FIG. 1 is configured to operate in a partial reflectance/partial emissive mode.

FIG. 10 is an illustration of an exemplary embodiment 1000 of the present invention wherein the projection screen 104 of FIG. 1 is configured to operate in a partial reflectance/partial emissive mode. In this embodiment, each color that is provided by the projection screen 104 is a combination of reflected and emitted light. The projection screen 104 may be designed to reflect at the desired projected ranges of wavelengths that are output by the projector 102, and absorb at all other visible wavelengths. For example, a substrate 1002 of the projection screen 104 may include absorption material 1004 configured as an interference-based induced absorber of high order such that reflectance peaks of the absorption material 1004 correspond to the excitation peaks of the fluorescent material 1006. Thus, the absorption material 1004 provides for reflectance of wavelengths of light in ranges that correspond to ranges of wavelengths of light emitted by the fluorescent material 1006.

The reflectivity of the absorption material 1004 may also improve emission of the projection screen 104. For instance, excitation wavelengths of light 1008 output by the projector 102 which are not absorbed in the first pass through the fluorescent material 1006 may be reflected by a surface 1010 of the absorption material 1004 and pass through the fluorescent material 1006 a second time for increased emission 1012. In an additional embodiment, non-excitation wavelengths are substantially absorbed by the absorption material 1004.

Figure 11:
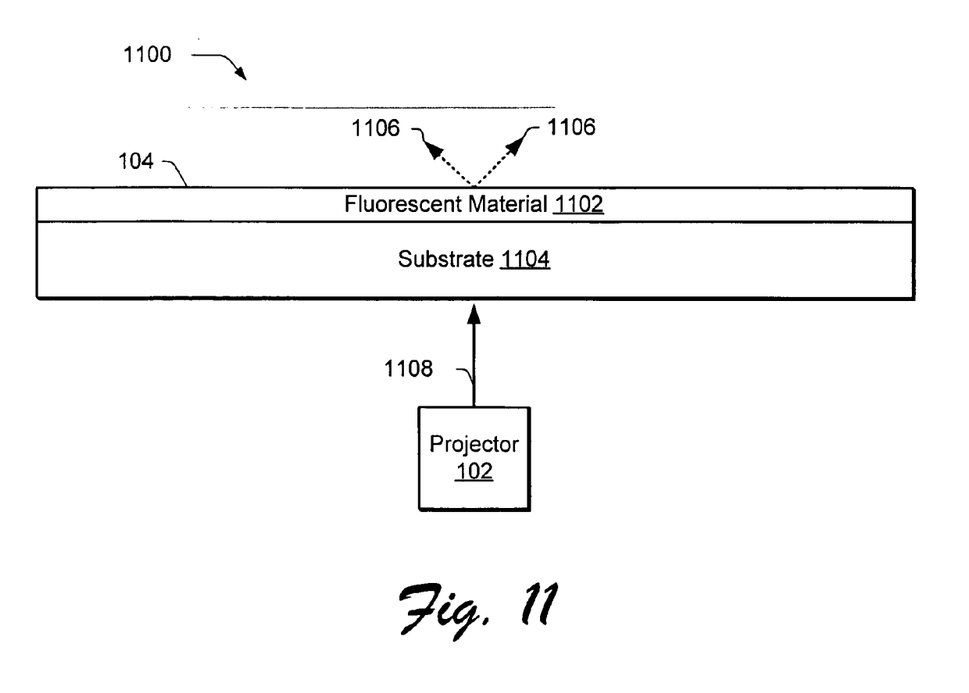
FIG. 11 is an illustration of an exemplary embodiment of the present invention showing the projection screen and the projector of FIG. 1 configured for use in a rear-projection mode.

FIG. 11 is an illustration of an exemplary embodiment 1100 of the present invention showing the projection screen 104 and the projector 102 of FIG. 1 configured for use in a rear-projection mode. Fluorescent material 1102 may also be used in a rear-projection television. In a rear-projection television, a substrate 1104 transmits light 1106 that is output by the projector 102 to be watched by the viewer. In other words, the projection screen 104 is positioned between viewer and the projector 102, as opposed to a front-projection system where the projector 102 and the viewer are positioned on the same side of the projection screen 104, an example of which is shown in FIG. 3. By utilizing the fluorescent material 1102, the projection screen 104 may emit visible light 1106 in a diffuse manner so that the projection screen 104 is viewable by a user from a variety of angles.

Additionally, the projection screen 104 may be configured to more efficiently output visible light that is provided by a light source in the projector 102. As previously stated, high pressure mercury arc lamps have a limited output of red light. High pressure mercury arc lamps, however, may output a substantial amount of ultraviolet light. Because rear projection televisions have the projector 102 enclosed behind the projection screen 104, illumination by the projector 102 may be matched to excitation and emission spectra of the projection screen 104 to provide several additional modes of operation. In one embodiment, the projector 102 outputs ultraviolet light 1108 in one or more ranges to stimulate emission of visible wavelengths of light. For example, the projection screen 102 may include a fluorescent material 1102 that is excited by a range of wavelengths of ultraviolet light and emits wavelengths of visible light in the blue portion of the visible spectrum. Another example includes the emission of a broadband spectrum such as that for white light when illuminated with ultraviolet radiation. In this way, the normally unused UV radiation can be utilized to increase the white light brightness. The projection screen 104 may also include additional fluorescent materials to convert visible wavelengths of light output by the projector 102 to emit visible wavelengths of light having longer wavelengths, such as by including the Texas Red fluorescent dye as discussed in relation to FIGS. 8 and 9. Therefore, the projector 102 may emit wavelengths of light, in the visible and/or ultraviolet spectrum, the incidence of which causes the projection screen 104 to emit visible light 1106 to form an image that is viewable by the human eye.

Figure 12:
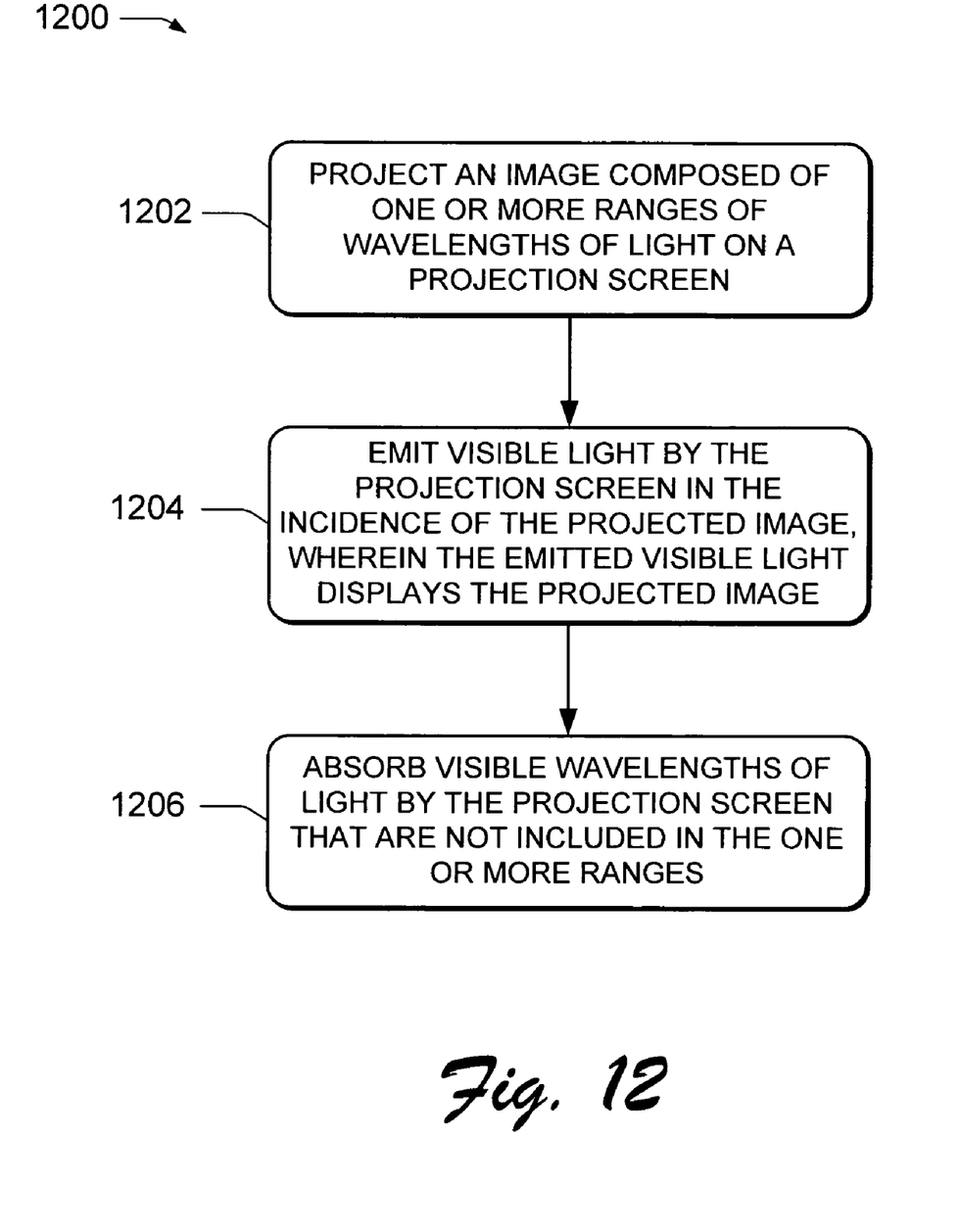
FIG. 12 is a flow chart depicting a procedure of an exemplary embodiment of the present invention wherein a projection screen emits light in response to light output by a projector.

FIG. 12 is a flow chart depicting a procedure of an exemplary embodiment 1200 of the present invention wherein a projection screen emits light in response to light output by a projector. At block 1202, an image is projected on a projection screen by a projector. The image is composed of one or more ranges of wavelength of light. For example, the image may be composed of narrow ranges of wavelengths of red, green and blue light. At block 1204, visible light is emitted by the projection screen with the incidence of the projected image. The projection screen, for instance, may include fluorescent materials which emit visible light with the incidence of the one or more ranges of wavelengths of light that are output by the projector, e.g. red, green and blue light. The emitted visible light displays the projected image.

At block 1206, the projection screen absorbs visible wavelengths of light that are not included in the one or more ranges of wavelengths of light. For instance, the projection screen may absorb wavelengths of light which do not excite the fluorescent material and do not correspond to wavelengths of light that are emitted by the fluorescent material.

Figure 13:
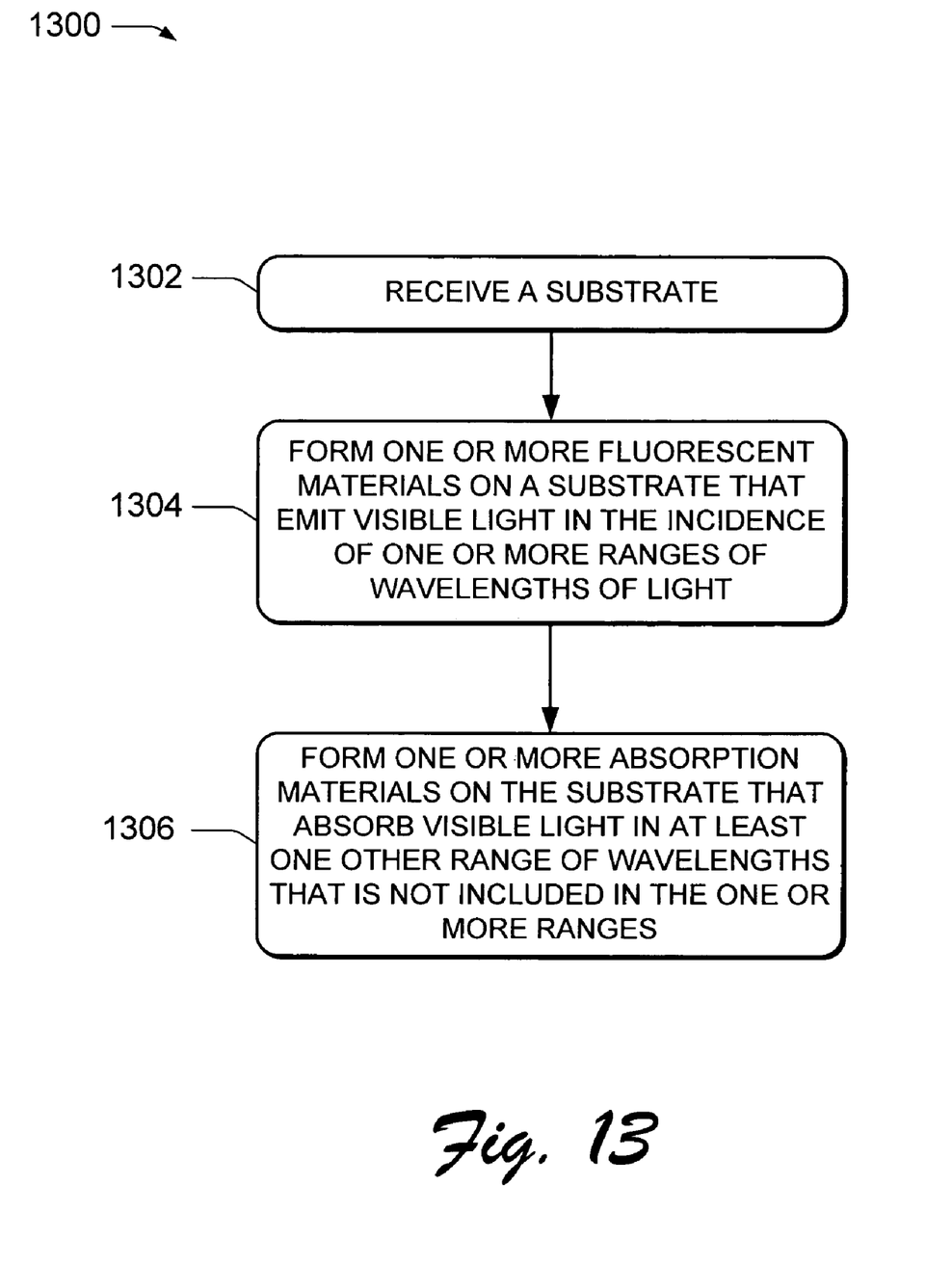
FIG. 13 is a flow chart depicting a procedure of an exemplary embodiment of the present invention wherein a projection screen is produced.

FIG. 13 is a flow chart depicting a procedure of an exemplary embodiment 1300 of the present invention wherein a projection screen is produced. At block 1302, a substrate is received. The substrate may be configured in a variety of ways, such as to be rigid or flexible, reflective, absorptive, transmissive and the like. At block 1304, one or more fluorescent materials are formed on the substrate. The fluorescent materials emit visible light with the incidence of one or more ranges of wavelengths of light. For example, the fluorescent materials may include fluorescent dyes having excitation spectra that correspond to one or more ranges of wavelengths of light output by a projector. The fluorescent materials may have emission spectra that provide an image in response to the output of the projector when formed on the substrate. The fluorescent materials may be formed on the substrate in a variety of ways, such as through deposition, formed as a film that is applied to the substrate, and so on.

At block 1306, one or more absorption materials are formed on the substrate that absorb visible light in at least one other range of wavelengths that is not included in the one or more ranges of wavelengths. In an embodiment, the one or more absorption materials absorb wavelengths of light that do not excite the fluorescent materials and are not emitted by the fluorescent materials. The one or more absorption materials may be formed on the substrate before the fluorescent materials, with the fluorescent materials, and/or after formation of the fluorescent materials on the substrate.

Although the invention has been described in language specific to structural features and methodological steps, it is to be understood that the invention defined in the appended claims is not necessarily limited to the specific features or steps described. Rather, the specific features and steps are disclosed as preferred forms of implementing the claimed invention.

What is claimed is:

1. A projection screen comprising a substrate having thereon:
   one or more fluorescent materials that:
      emit visible light with an incidence of one or more ranges of wavelengths of light; and
      absorb visible light in at least one other range of wavelengths that is not included in the one or more ranges; and
   one or more absorption materials, disposed between the substrate and the one or more fluorescent materials, that reflect wavelengths of light in the one or more ranges and absorb wavelengths of light that are not included in the at least one other range nor in the one or more ranges,
   wherein the visible light emitted by the one or more fluorescent materials provides an image with an incidence of an output from a projector having wavelengths of light in the one or more ranges and the output from the projector is directional and the emitted visible light has a Lambertian distribution.

2. A projection screen as described in claim 1, wherein the substrate is transparent to the visible light.

3. A projection screen as described in claim 1, wherein the one or more ranges include:
   a range of red wavelengths of visible light;
   a range of green wavelengths of visible light; and
   a range of blue wavelengths of visible light.

4. A projection screen as described in claim 1, wherein the emitted visible light includes:
   a range of red wavelengths of visible light;
   a range of green wavelengths of visible light; and
   a range of blue wavelengths of visible light.

5. A projection screen as described in claim 1, wherein the one or more ranges include a range of ultraviolet wavelengths.

6. A projection screen as described in claim 1, wherein the one or more ranges include a range of ultraviolet wavelengths and a range of visible wavelengths.

7. A projection screen comprising a substrate having thereon:
   one or more fluorescent materials that:
      emit visible light with an incidence of one or more ranges of UV wavelengths of light; and
   one or more absorption materials, between the substrate and the one or more fluorescent materials, that absorb wavelengths of light that are not included in the one or more ranges and are not included in the at least one other range and reflect wavelengths of light that are included in the one or more ranges;
   wherein the visible light emitted by the one or more fluorescent materials contributes to an image with an incidence of an output from a projector having wavelengths of light in the one or more ranges and the output from the projector is directional and the emitted visible light has a Lambertian distribution.

8. A projection screen as described in claim 7, wherein the emitted visible light includes:
   a range of red wavelengths of visible light;
   a range of green wavelengths of visible light; and
   a range of blue wavelengths of visible light.

9. A projection system comprising:
   a projector that is configured to project an image composed of one or more ranges of wavelengths of light; and
   a projection screen for receiving the projected image comprising:
      a substrate;
      a fluorescent material that is configured to:
         emit visible light with the incidence of the one or more ranges of wavelengths of light wherein the emitted visible light has a Lambertian distribution; and
         absorb visible wavelengths of light in at least one other range that is not included in the one or more ranges; and
      an absorption material disposed between the substrate and the one or more fluorescent materials which is configured to:
         absorb wavelengths of light that are not included in the one or more ranges and are not included in the at least one other range; and
         reflect wavelengths of light in the one or more ranges.

10. A projection system as described in claim 9, wherein the emitted visible light includes:
   a range of red wavelengths of visible light;
   a range of green wavelengths of visible light; and
   a range of blue wavelengths of visible light.

11. A projection system as described in claim 9, wherein the one or more ranges include a range of ultraviolet wavelengths.

12. A projection system as described in claim 9, wherein the one or more ranges include a range of ultraviolet wavelengths and a range of visible wavelengths.

13. A projector comprising:
   a light source that outputs one or more ranges of UV wavelengths of light; and
   an image forming device that forms an image composed of the one or more ranges of UV wavelengths of light such that with the incidence of the image on a projection screen, the projection screen emits visible light such that the image is viewable by the human eye, the projection screen including:
      one or more fluorescent materials that emit visible light with the incidence of the one or more ranges of wavelengths of light and absorb wavelengths of light in at least one other range; and
      one or more absorption materials, between a substrate and the one or more fluorescent materials, that absorb wavelengths of light that are not included in the one or more ranges and are not included in at least one other range and reflect wavelengths of the one or more ranges,
   wherein the image that is formed by the projector is directional and the emitted visible light has a Lambertian distribution.

14. A projector as described in claim 13, wherein the emitted visible light includes:
   a range of red wavelengths of visible light;
   a range of green wavelengths of visible light; and
   a range of blue wavelengths of visible light.

15. A projection system comprising:
   a projector that is configured to project an image composed of one or more ranges of UV wavelengths of light; and
   a projection screen for receiving the projection image that includes:
      one or more fluorescent materials that emit visible light with the incidence of the one or more ranges of wavelengths of light and absorb wavelengths of light in at least one other range, wherein the projected image is directional and the emitted visible light has a Lambertian distribution; and one or more absorption materials, between a substrate and the one or more fluorescent materials, that absorb wavelengths of light that are not included in the one or more ranges and are not included in the at least one other range and reflect wavelengths of light in the one or more ranges.

16. A projection system as described in claim 15, wherein the emitted visible light includes:

a range of red wavelengths of visible light;
a range of green wavelengths of visible light; and
a range of blue wavelengths of visible light.

17. A method comprising:

forming over a substrate one or more absorption materials that reflect wavelengths of light in one or more ranges and absorb wavelengths of light that are not included in the one or more ranges and are not included in the at least one other range;

forming over the one or more absorption materials one or more fluorescent materials that emit visible light with an incidence of the one or more ranges of wavelengths of light and absorb wavelengths of light in the at least one other range, wherein the visible light emitted by the one or more fluorescent materials provides an image with an incidence of an output from a projector having wavelengths of light in the one or more ranges and the emitted visible light has a Lambertian distribution.

18. A method as described in claim 17, wherein the one or more ranges include a range of ultraviolet wavelengths.

19. A method as described in claim 17, wherein the one or more ranges include a range of ultraviolet wavelengths and a range of visible wavelengths.

20. A projection screen comprising a structure made by the method of claim 17.

21. A system comprising:

means for projecting an image composed of one or more ranges of wavelengths of light; and means for displaying the projected image that is configured to:

emit visible light from one or more fluorescent materials with an incidence of the one or more ranges of wavelengths of light wherein the emitted visible light has a Lambertian distribution;

absorb visible wavelengths of light with the one or more fluorescent materials in at least one other range that is not included in the one or more ranges;

absorb wavelengths of light, with one or more absorption materials, that are not included in the one or more ranges nor in the at least one other range; and reflect wavelengths of light in the one or more ranges with the one or more absorption materials, wherein the one or more absorption materials are between a substrate and the one or more fluorescent materials.

22. A system as described in claim 21, wherein the projecting means includes a projector.

23. A system as described in claim 21, wherein the displaying means includes a projection screen.

* * * * *